UNITED STATES PATENT OFFICE.

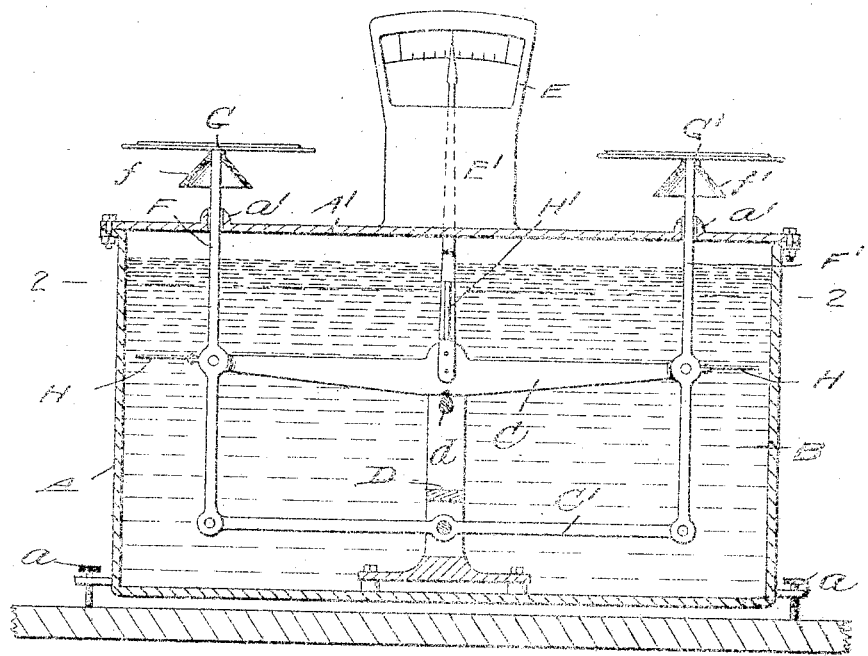
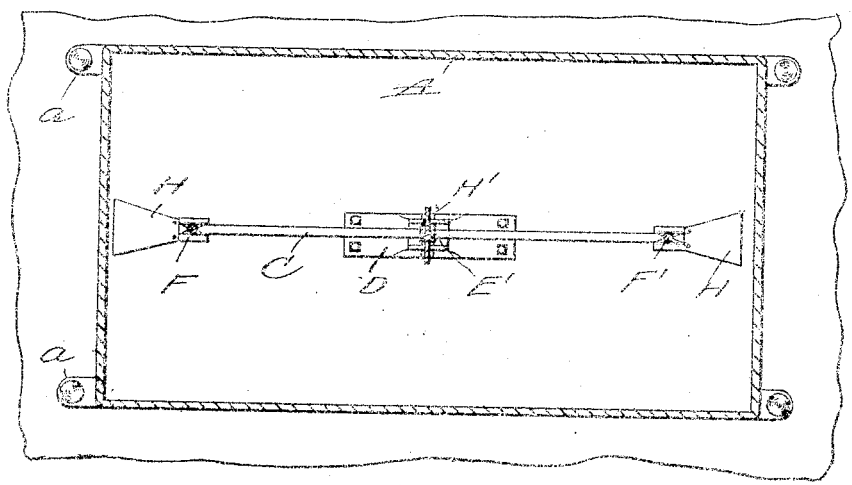

GEORGE LORD RUSHTON, OF OMAHA, NEBRASKA.

SCALE.

1,211,881.  Specification of Letters Patent.  Patented Jan. 9, 1917.

Application filed November 17, 1914. Serial No. 272,530.

*To all whom it may concern:*

Be it known that I, GEORGE L. RUSHTON, a citizen of the United States, and a resident of Omaha, in the county of Douglas and State of Nebraska, have invented an Improvement in Scales, of which the following is a specification.

My present invention relates generally to scales and more particularly to scales utilized in the weighing of butter and other products exuding a briny fluid or one otherwise having deteriorative effect upon metal, my object being to provide a scale the working parts of which are wholly immersed in oil and covered whereby to prevent the entrance of the deteriorating fluids as well as to effectively cushion and control the movements of the scale parts in order to promote quick reading. In carrying out these objects I provide a scale the parts of which are constructed and arranged substantially as shown in the accompanying drawing, forming a part of this specification, and in which—

Figure 1 is a vertical longitudinal section through a scale constructed in accordance with my invention, and Fig. 2 is a horizontal section taken therethrough substantially on line 2—2 of Fig. 1.

Referring now to these figures, I have shown a casing A adapted to be properly positioned upon a suitable support by means of leveling screws $a$, and of such dimensions as to completely inclose the working parts of the balance and to receive a supply of oil indicated in Fig. 1 at B the level of which comes substantially above the upper balance beam C centrally fulcrumed upon a knife edge $d$ carried by the supporting upright D in turn disposed at an intermediate point upon the base of the casing A. This casing has a cover A' which intermediately supports a segmental dial E and is provided with apertures having surrounding and upstanding bosses $a'$ through which the posts F and F' project, the upper outer ends of these posts supporting the weighing pans G and G' and the lower portions thereof being pivotally united at spaced points to the extremities of the upper and lower balance beams C and C'.

The upper ends of the posts F and F' are also provided with depending petticoats $f$ and $f'$ below the weighing pans G and G' above and outstanding beyond the bosses $a'$ surrounding the apertures of the casing top in order to prevent the deteriorating fluids from dripping directly into the casing.

Intermediately of the upper balance beam C, and above the knife edge $d$ is mounted the indicator needle E', which coöperates with the dial E.

In this manner the direct entrance or drip of any deteriorating fluid into the casing is wholly prevented and even in the case of splash onto the posts F and F' below their petticoats $f$ and $f'$, the fact that the working parts are immersed in oil will cause the fluid to be held upon the surface of the oil and thus prevent it from descent to the bearings of the working parts. Thus the life of a scale utilized in connection with the weighing of butter and such products will be greatly lengthened and, by virtue of the fact that the working parts travel in oil and are thus subject to check and control in a certain measure, a quick and accurate reading upon the dial may be had at all times, this being particularly desirable.

In order to further influence the latter effect, I provide the ends of the upper balance beam C with horizontally outstanding blades H which are preferably flared in an outward direction and flattened to an extent sufficient to promote the desired resistance in movement through the oil. I may also provide an upright blade H' directly above the fulcrum of the upper balance beam C thus increasing the resistance.

I claim:

1. In a weighing scale, the combination of an inclosing casing adapted to contain a quantity of oil or similar fluid, balance beams disposed and supported within the casing below the level of the fluid therein, posts connected to the balance beams below the level of the oil and having their upper ends projecting vertically beyond the casing, weighing pans disposed upon the upwardly projecting ends of the posts above the casing, and a top secured upon the upper portion of the casing and through which the posts work, all for the purpose described.

2. The combination with the working parts of a scale, of a casing inclosing said working parts, a working fluid disposed within the casing and immersing the bearings of and connections between the said working parts, and resistance blades secured to certain of the working parts and movable in the fluid whereby to coöperate with the fluid to cushion and control movements of the said working parts, all substantially as described.

3. A scale, the working parts of which are immersed in a working fluid, and including a partly immersed indicator arm certain of which working parts and said indicator arm are provided with resistance blades working in the said fluid.

GEORGE LORD RUSHTON.

Witnesses:
STANLEY GREEN,
WM. M. SESSIONS.